United States Patent [19]
Newnes

[11] 3,760,959
[45] Sept. 25, 1973

[54] LUMBER STACKER
[76] Inventor: Ray William Newnes, Box 8, Salmon Arm, British Columbia, Canada
[22] Filed: Dec. 15, 1971
[21] Appl. No.: 208,220

[52] U.S. Cl. ............................................. 214/6 DK
[51] Int. Cl. ............................................. B65g 57/10
[58] Field of Search ................. 214/6 P, 6 DK, 6 H, 214/6 G, 6 M

[56] References Cited
UNITED STATES PATENTS

| | | | |
|---|---|---|---|
| 2,861,702 | 11/1958 | Mason | 214/6 H |
| 3,610,443 | 10/1971 | Berge et al. | 214/6 DK |
| 3,393,812 | 7/1968 | Mayo et al. | 214/6 DK |
| 3,081,888 | 3/1963 | Lawson | 214/6 H |
| 2,915,202 | 12/1959 | Aitken | 214/6 DK |
| 3,122,241 | 2/1964 | Lawson, Sr. | 214/6 DK |
| 2,065,673 | 12/1936 | Fay, Jr. | 214/6 DK |
| 3,520,422 | 7/1970 | Bruce et al. | 214/6 DK |
| 2,730,247 | 1/1956 | Lawson | 214/6 H |
| 2,686,603 | 8/1954 | Lawson | 214/6 H |

*Primary Examiner*—Robert J. Spar
*Attorney*—Lawrence I. Field

[57] ABSTRACT

A lumber stacker having a transfer chain, a set of lumber carrying forks and a stacking platform; a lug upstanding from the forks, a substantially vertically movable roller under the free forward end of the forks, a substantially vertically movable stop which can be moved upwardly to halt the forward movement of lumber on the transfer chain, a drive mechanism secured to the rearward end of the forks and an activating mechanism associated with the drive mechanism for controlling the operation of the roller and the stop.

6 Claims, 7 Drawing Figures

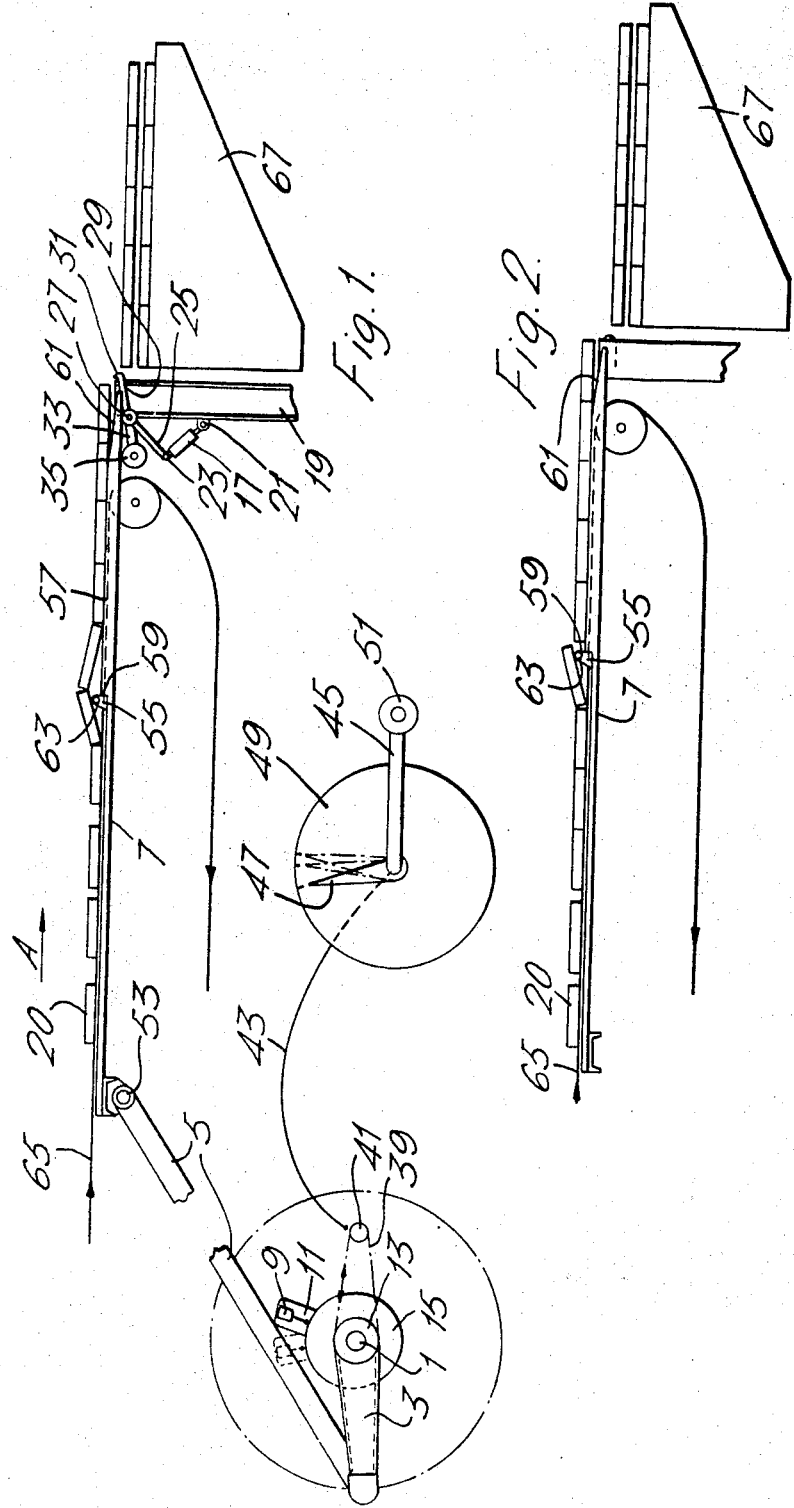

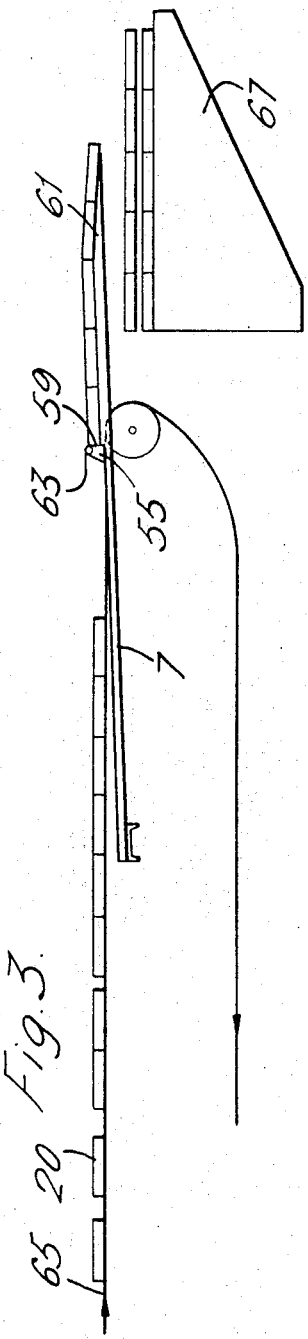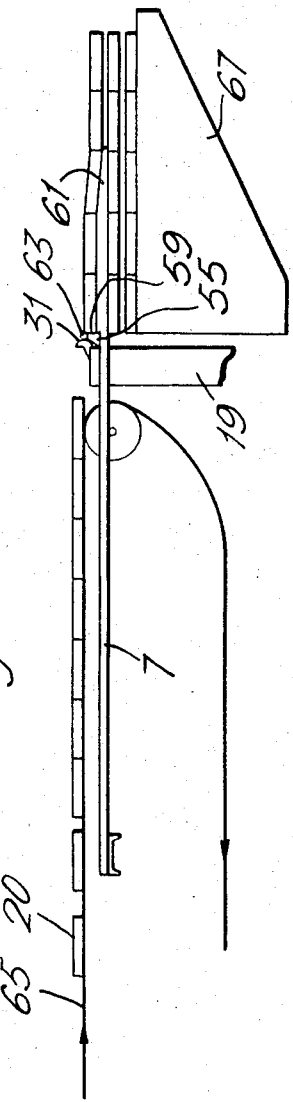

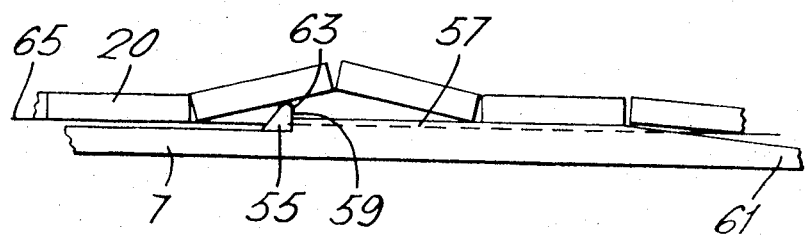
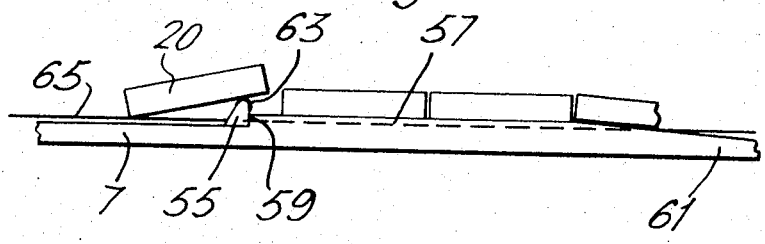
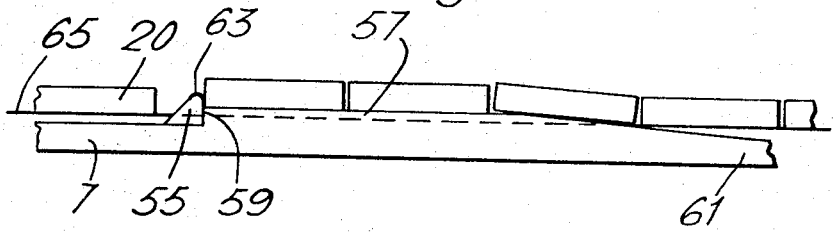

LUMBER STACKER

FIELD OF INVENTION

This invention relates to a lumber stacker which is capable of forming stacks of different widths, the lumber being aligned along the edges and the rear of the stack.

DESCRIPTION OF PRIOR ART

Prior art lumber stackers receive lumber from a saw mill along transfer chains, this lumber being formed successively into tiers which are held by stops before being lifted by reciprocating forks onto a stack which is being formed. The apparatus for forming tiers usually includes a counting mechanism which greatly complicates the stacker.

Also lumber which is being stacked for drying purposes is never of a uniform dimension, it varying slightly in width and thickness and being twisted and having varying amounts of wane and warp so often creating a problem in forming a satisfactory tier.

SUMMARY OF INVENTION

The invention of this application relates to a lumber stacker in which it is not necessary to form a tier of lumber on the transfer chains. The forks of the stacker are provided with a lug such that when the forks are moved forwardly and upwardly the lug separates a tier of lumber from the front end of the lumber being held on the stacker, and places the separated tier upon a stack being formed. The timing of the cycle for raising the forks can be varied so varying the position of insertion of the lug into the lumber and so making provision for forming a tier and hence a stack of a different length when the lumber dimensions are changed. As an example, eight pieces of 2 inch by 6 inch lumber will make a tier of 48 inch length, while five pieces of 2 inch by 10 inch lumber will make a tier of 50 inch length.

The adjustment of the operation of the stacker to accommodate a different lumber dimension is accomplished from a place remote from the stacker so that there is no necessity to halt the operation of the stacker to perform adjustments. Preferably the adjustment control is at an operator's position which is relatively close to the stacker forks such that the operator can quickly relocate any pieces of lumber which are displaced from their correct position on the transfer chains and would cause jamming of the operation.

It is also possible to vary the lifting position of the forks during operation to take into account minor variations in size of lumber if this becomes necessary.

The lumber stacker of this invention can also be used on dressed or finished lumber as it does not mark or deface the finished product.

Also no overhead devices are required to hold down lumber on the stacker or to move lumber onto the stack. This simplifies the stacking operation and also provides easy accessibility to the stacker.

The invention will now be described with reference to the accompanying drawings which show schematically a preferred embodiment of the lumber stacker.

BRIEF DESCRIPTION OF THE DRAWINGS

FIG. 1 is a partial elevational view of the operating parts of the lumber stacker.

FIG. 2 is a partial view of the lumber stacker at the beginning of an operational cycle.

FIG. 3 is a part elevational view of the lumber stacker in the middle of its operating cycle.

FIG. 4 is a part elevational view of the lumber stacker near the end of its operating cycle.

FIGS. 5, 6, and 7 are enlarged part elevational views showing the operation of the forks when separating the lumber.

DESCRIPTION OF THE PREFERRED EMBODIMENTS

In the drawings only one set of forks is shown together with the apparatus for operating one set of forks, however the lumber stacker will normally be constructed with more than one set of forks.

Referring mainly to FIG. 1 an operating shaft 1 is rotatably driven by a prime mover and gearing system (not shown) in a well known manner, and operates an arm 3, a link 5 and forks 7. The forks 7 are supported so that they can reciprocate in a generally horizontal manner. An activating switch 9 is secured to a plate 11 which can be rotated through a toothed wheel 13 which is rotatably mounted on the shaft 1. A cam 15 is secured to the shaft 1 in a position such that it can operate switch 9. The switch 9 is electrically connected to an electropneumatic system which is in operative connection with an air cylinder 17 secured at the stacking end of the framework 19 of the stacker. One end of the cylinder 17 is secured through a pivotal attachment 21 to the framework 19 while the piston rod 23 is pivotally secured to an arm 25 which rotates a shaft 27 held in suitable bearings (not shown) on frame 19. To shaft 27 is attached an arm 29 having a stop in the form of a hooked end 31, and an arm 33 having a roller 35 rotatably mounted at its free end. The forks 7 are supported between the roller 35 and a bearing 53 on the arm 5.

The position of the switch 9 relative to the cam 15 is adjustable through a roller chain 39 connecting the toothed wheel 13 to a toothed wheel 41 which is suitably mounted on part of the frame of the lumber stacker. A Bowden cable 43 is operatively connected between the end of the shaft holding the wheel 41 and an arm 45 which can be mounted on a separate pedestal (not shown) in a convenient position for an operator. An indicator 47 is positioned in front of a disc 49 for indicating the position of the switch 9. A knob 51 is provided at the end of the arm 45.

It will be appreciated that the drive between the arm 45 and the plate 11 holding the limit switch 9 can be of other forms than that shown in FIG. 1.

The forks 7 are constructed with a raised portion 57 which has a step 59 and an angled front portion 61. A lug 55 is secured at the step 59, and a small roller 63 is provided at its upper end.

The path of travel of a transfer chain is shown schematically at 65.

The lumber is stacked upon a platform 67 which is supported in a well known manner on springs or pneumatic cylinders such that, when a tier of lumber is placed upon it, it automatically drops approximately the height of the tier, so permitting the next tier of lumber to be placed on it at the same height as was the previous tier.

In operation, lumber 20 is brought into the stacker in the direction A in FIG. 1 upon transfer chains 65, and held on the stacker by hooked portion 31, the transfer chains 65 sliding under the lumber. When the cam 15 activates the switch 9, the cylinder 17 is operated, lowering the hooked portion 31 and raising the roller 35 to so lift the forward ends of the forks 7. The forks 7 are then moving forwardly at a greater speed than the transfer chains 65 and carrying lumber upon them. The position of the lumber relative to the forks may then be as shown in FIG. 5. As the forks move forwardly, lumber which was normally held together by rough edges is separated as shown in FIG. 6, and upon further movement of the forks, the lug 55 abuts the last piece of lumber in the tier as shown in FIG. 7. The tier of lumber is then moved, as in FIG. 3, onto the stack of lumber being formed, and is placed onto the stack as shown in FIG. 4, the forks 7 then being withdrawn. Retention members are utilized on the stacker framework for aligning the rearward edge of the lumber stack as the forks are being withdrawn from the stack. Also, as the forks 7 are being withdrawn, the cam 15 activates the switch 9 which operates the cylinder 17 so returning the hook portion 13 to an upward position to hold the lumber being moved by the transfer chains, and lowering the roller 35 so lowering the forks 7 and the lug 55 below the lumber on the stacker.

When a different nominal width of lumber is being stacked, it is necessary to be able to arrange for the lug 55 to be raised under the lumber at the position in which it will permit the forks to carry forward a tier of lumber of the required width to make a relatively solid stack. The position at which the lug 55 is raised under the lumber is determined by the activation of the switch 9 through which the roller 35 is raised when the fork 7 are moving forwardly. The timing of the switch activation is altered by moving the plate 11 relative to the cam 15 by the control arm 45. The location of the control arm 45 is such that an operator can view the fork operation as he is altering the timing of the fork movement. During normal operation there is usually no requirement to alter the timing of the fork movement to take into account differences in dimensions of nominal size lumber, however, if such a requirement occurs it can obviously be attended to without halting the operation of the stacker.

The switch 9 has been shown mounted upon the shaft 1, but it would be equally feasible to mount the switch 9 so that it can be operated from the forks 7 by contact with a projection or the like extending from the forks.

It is also possible to utilize hydraulic or pneumatic mechanism for obtaining reciprocation of the forks 7.

I claim:

1. In a lumber stacker having a transfer chain, a set of lumber carrying forks and a stacking platform; a lug upstanding from at least two of the forks, a substantially vertically movable roller under the free forward end of the forks for raising and lowering said forks, a substantially vertically movable stop which can be moved upwardly to halt the forward movement of lumber on said transfer chain and downwardly to a retracted, non-interfering position, a drive mechanism secured to the rearward end of the forks and an activating mechanism operatively connected to said drive mechanism for controlling the operation of said roller and said stop, said drive mechanism including a rotating member and a linkage for reciprocating said forks in a horizontal direction, said activating mechanism including a cam secured to said rotating member, a switch operably positioned adjacent to said cam and a plate positioned to support said switch, said plate being movable around said cam such that the activation of said switch can be varied relative to the operation of the drive mechanism by moving said plate.

2. A lumber stacker as in claim 1, wherein said plate can be moved from a position remote from said drive mechanism.

3. A lumber stacker as in claim 1, wherein said roller and said stop are secured to the arms of a bell-crank lever such that when the roller is moved upwardly the stop is moved downwardly.

4. A lumber stacker as in claim 1, wherein a second roller is secured to the upper end of said lug.

5. A lumber stacker as in claim 1, wherein a step is provided in said forks at the position of securement of the lug, the forks being generally thicker from the step to their free forward end than from the step to their rearward end.

6. A lumber stacker as in claim 1, wherein said roller and said stop are pneumatically operated, and said switch activates pneumatic controls.

* * * * *